United States Patent [19]

Kawakami et al.

[11] 4,049,170
[45] Sept. 20, 1977

[54] DEVICE FOR PULLING UP AND PAYING OUT AN OIL BOOM

[75] Inventors: Hiroshi Kawakami, Kamakura; Isao Nagaoka; Yukio Tsukagawa, both of Yokohama, all of Japan

[73] Assignee: Bridgestone Tire Company Limited, Tokyo, Japan

[21] Appl. No.: 679,613

[22] Filed: Apr. 23, 1976

[30] Foreign Application Priority Data

May 1, 1975 Japan .................................. 50-52008

[51] Int. Cl.² .............................................. B65H 17/34
[52] U.S. Cl. ........................................ 226/74; 226/171; 61/1 F
[58] Field of Search ................. 226/171, 172, 173, 74, 226/77; 61/1 F, 107, 114

[56] References Cited

U.S. PATENT DOCUMENTS

| 1,904,885 | 4/1933 | Seeley | 226/172 |
| 2,981,454 | 4/1961 | Dickinson | 226/172 |
| 3,024,956 | 3/1962 | Gretter | 226/172 X |
| 3,106,325 | 10/1963 | Kitching | 226/171 |
| 3,120,017 | 2/1964 | Ciaccio | 226/171 X |
| 3,469,819 | 9/1969 | Puretic | 226/172 X |

Primary Examiner—Richard A. Schacher
Attorney, Agent, or Firm—Sughrue, Rothwell, Mion, Zinn and Macpeak

[57] ABSTRACT

A device for pulling up and paying out an oil boom comprises a structural frame, a pair of end pulleys horizontally journaled on the frame, an endless belt engaged with the end pulleys and having a plurality of engaging projections for oil boom and a pusher member for slightly urging the oil boom against the endless belt, the pusher member being resiliently supported by a supporting member with a proper distance held between the bottom portion of the pusher member and the upper surface of the endless belt.

4 Claims, 5 Drawing Figures

DEVICE FOR PULLING UP AND PAYING OUT AN OIL BOOM

This invention relates to a device for pulling up and paying out an oil boom to be deployed on water surface.

Recently, oil booms of various types have been used for diminishing the pollution of harbors, waterways and high seas caused by the presence of oil slicks thereon deposited by the wanton acts of certain individuals or by accident. In use of the oil boom, it is common practice to deploy the oil boom around the oil slicks dispersed on water surface and then collect the oil contained therein with a suitable means. For this purpose, there have been proposed various devices for pulling up and paying out the oil boom, for instance, in U.S. Pat. No. 3,703,811 and 3,731,491. According to these patents, however, the oil boom is payed out and pulled up only by the rotation of a reel located on the deck of a work boat or in other convenient places, so that there are such drawbacks that the pull-up and pay-out operation of the oil boom is not reliable due to slip on the reel and the like and requires a great labor and that the oil boom is apt to be damaged during such operation.

An object of the invention is to solve the above mentioned drawbacks and to provide a novel device for pulling up and paying out an oil boom easily and surely without troubles.

According to the invention, there is provided a device for pulling up and paying out an oil boom comprising a structural frame, a pair of end pulleys journaled on the frame in a substantially horizontal direction, an endless belt engaged with the two end pulleys and having at its upper surface a plurality of engaging projections for an oil boom, and a pusher member for slightly urging the oil boom against the endless belt, the pusher member being resiliently supported by a supporting member with a proper distance held between the bottom portion of the pusher member and the upper surface of the endless belt.

The invention will now be described in greater detail with reference to the accompanying drawings, wherein.

Figure 1:
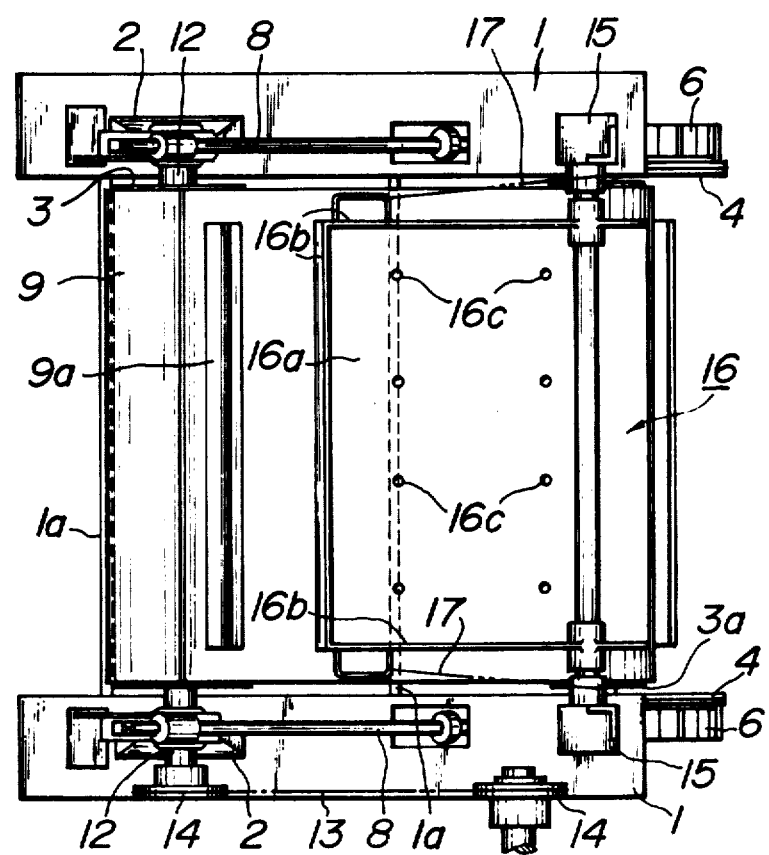
FIG. 1 is a plan view of an embodiment of the device for pulling up and paying out an oil boom according to the invention.
Figure 2:
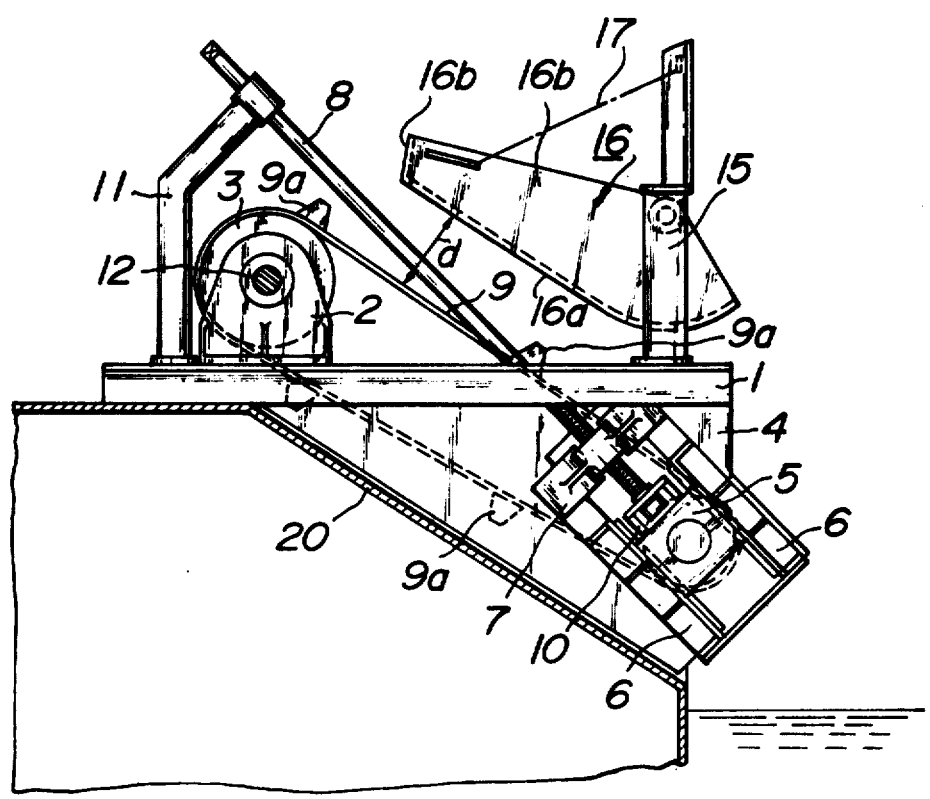
FIG. 2 is a side view of the device shown in FIG. 1.

Referring to FIGS. 1 and 2, numeral 1 represents a pair of structural frames located on a stern 20 of a work boat, a quay or the like and connected to each other with a plurality of connecting rods 1a. An end pulley 3 is journaled in a substantially horizontal direction on the frames 1, 1 with supporting members 2, 2 each extending upwardly from the frame. Another end pulley 3a is journaled in a substantially horizontal direction between side plates 4, 4 each extending downwardly from the frame 1 in such a manner that the end pulley 3a can be displaced relative to the end pulley 3 so as to vary the distance between them. To the end portion of each side plate 4 is fixed a pair of guide members 6, 6, and a journal block 5 for the end pulley 3a is interposed therebetween. The journal block 5 is moved by rotation of an adjust rod 8, which is screwed in a female threaded block 7 attached to the side plate 4, whereby an endless belt 9 engaging with the end pulleys 3, 3a is tensioned properly. The lower end of the adjust rod 8 is rotatably mounted on a yoke 10 attached to the journal block 5 and the upper end thereof is journaled in a supporting post 11 standing from the frame 1. Thus, by rotating the adjust rod 8 with a wrench or the like, the journal block 5 can be moved in an axial direction of the rod.

The endless belt 9 engaging with the end pulleys 3, 3a is composed of an elastic material such as rubber, synthetic resin and the like reinforced with a canvas or the like and has at its upper surface a plurality of engaging projections 9a for an oil boom $a$ at suitable intervals in running direction. In this embodiment, the engaging projection 9a has a trapezoidal section and is composed of the same elastic material as used in the endless belt 9 so as to be integrate with the endless belt in widthwise direction. The endless belt 9 is driven by rotating a shaft 12 of the end pulley 3 by a driving means (not shown) such as a fluid motor and the like.

Moreover, numerals 13 and 14 represent a chain and a chain wheel for transmitting a power from the driving means to the shaft 12 of the end pulley 3, respectively.

According to the invention, the oil boom $a$ is pulled up from water surface or payed out on water surface by riding it on the endless belt 9. Therefore, in order to slightly urge the oil boom against the endless belt so as to prevent slipping on the endless belt, a pusher member 16 is pivotably and resiliently supported by a suitable fixing member such as a pair of supporting posts 15, 15 each standing from the frame 1 and the like. The pusher member 16 is constituted with a metal bottom plate 16a having a curved front portion and a flat rear portion and three metal side plates 16b, each plate being made of steel or the like. Further, the pusher member 16 is auxiliarily supported by a supporting element 17 such as chain, wire, spring and the like, which is tensioned between the side plate 16b and the upper portion of the supporting post 15, so as to maintain a proper distance $d$ between the bottom portion 16a of the pusher member and the upper surface of the endless belt 9. The pivot portion of the pusher member 16 may be slidably fixed to each of the supporting posts 15, 15 in such a manner that the distance $d$ between the bottom portion 16a of the pusher member 16 and the upper surface of the endless belt 9 can optionally be adjusted depending upon the kind of oil boom to be used. The supporting elements 17, 17 are provided so that the pusher member 16 does not excessively urge the oil boom against the endless belt 9, but they may be omitted depending upon the form, weight and supporting position of the pusher member 16, if necessary. Moreover, numeral 16c represents a drain hole in the pusher member 16.

According to the invention, oil booms of various types usually used in the art may be employed. Among them, an oil boom formed by fixing a plurality of floats to one or both sides of a continuous flexible skirt at suitable intervals in lengthwise direction is preferable.

Figure 3:
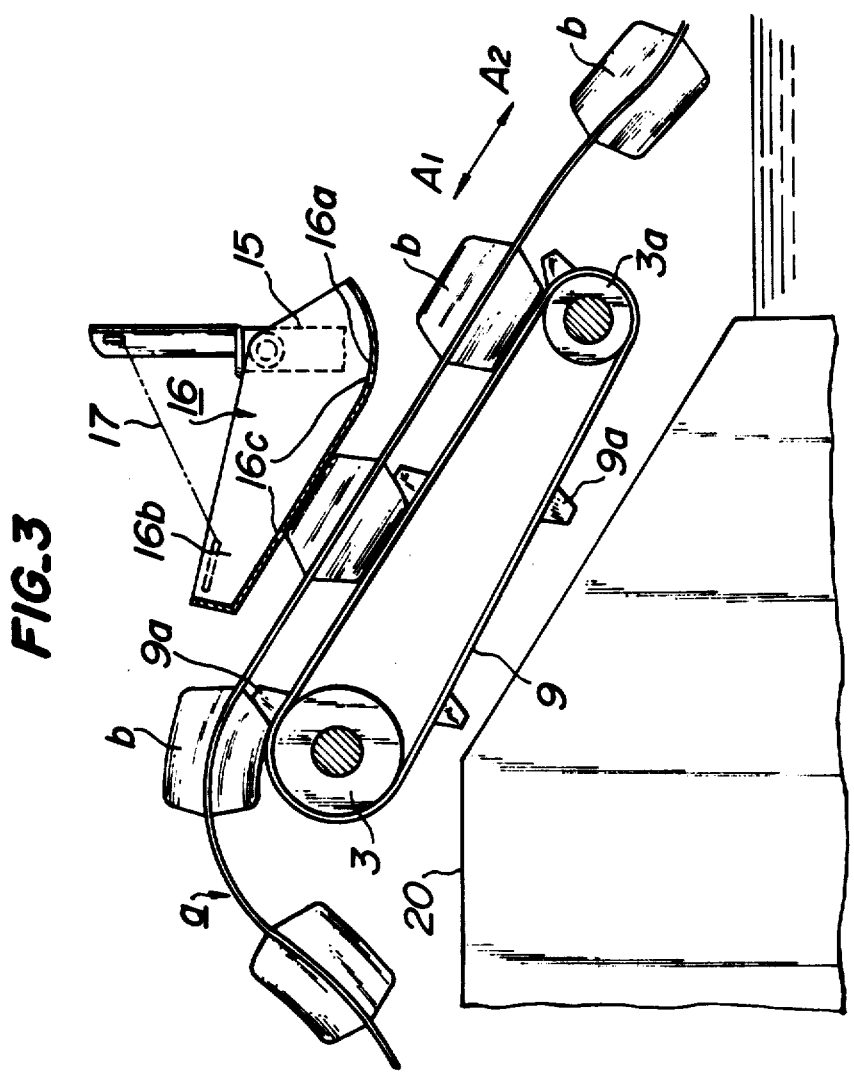
FIG. 3 is a schematically side elevation illustrating a pull-up operation of oil boom with the device shown in FIG. 1.

Next, an operation of the device according to the invention will be described with reference to FIG. 3 using the above mentioned oil boom.

In a pull-up operation, an oil boom $a$ is placed in turned-over state between the endless belt 9 and the pusher member 16 so as to engage a float $b$ with the engaging projection 9a and then the endless belt 9 is driven by rotating the end pulleys 3, 3a by a driving means (not shown). In this way, the oil boom $a$ is ordinarily pulled up in a direction shown by arrow $A_1$ while slightly urging the float b with the pusher member 16. In a pay-out operation, the oil boom a is placed between the endless belt 9 and the pusher member 16 according to the above mentioned manner and then the endless belt 9 is reversely driven, whereby the oil boom a is payed out in a direction shown by arrow $A_2$.

Figure 4:
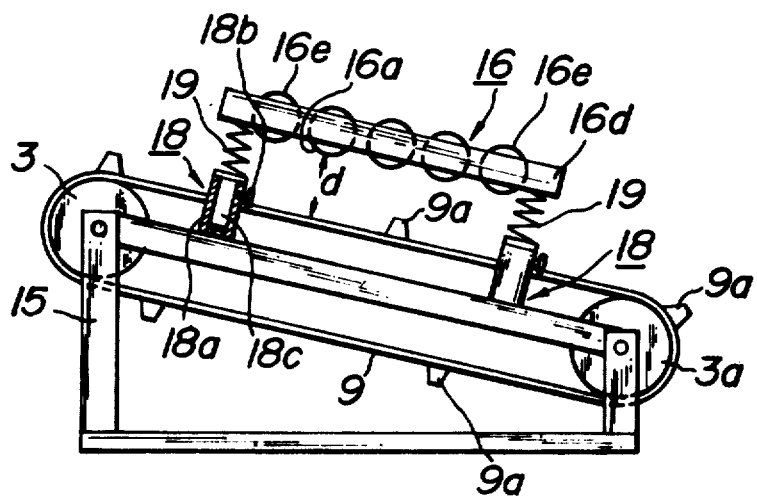
FIGS. 4 and 5 are side views of another embodiments of the device for pulling up and paying out an oil boom according to the invention, respectively.
Figure 5:
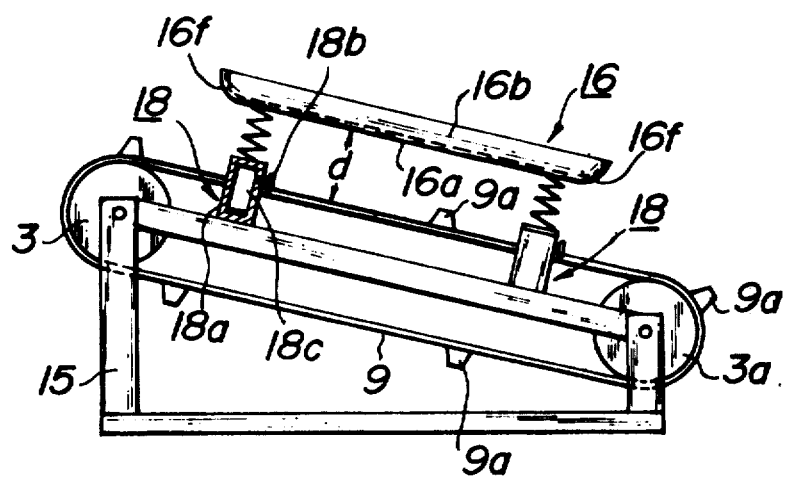

FIGS. 4 and 5 show another embodiments of the pusher member 16 resiliently supported by a suitable fixing member such as the supporting posts 15, 15, respectively.

Referring to FIG. 4, the pusher member 16 comprises a roller frame 16d and a plurality of rollers 16e journaled therein along the upper surface of the endless belt. The roller frame 16d is resiliently supported by a plurality of spring supporters 18 located on the supporting posts 15, 15 and a plurality of compression springs 19 each set on the supporter 18. Thereby, a given distance d is maintained between the lower surface of the roller 16e, i.e. bottom portion 16a of the pusher member 16 and the upper surface of the endless belt 9. The spring supporter 18 is constituted with a fixed sleeve 18a and a sliding member 18c slidably fitted therein and setting with a screw 18b, so that the distance d can be optionally adjusted depending upon the kind of oil boom to be used. Furthermore, the rollers 16e may be driven by any driving means.

Referring to FIG. 5, the pusher member 16 is constituted with a bottom plate 16a having curved front and rear portions 16f and two side plates 16b and is resiliently supported by the same supporting mechanism as shown in FIG. 4.

In the embodiments of FIGS. 4 and 5, the pull-up and pay-out operation of the oil boom is effected in the same manner as described in the embodiment of FIG. 1.

According to the invention, it is preferable to employ an oil boom comprising a continuous flexible skirt and a plurality of floats attached to one or both sides thereof at suitable intervals in lengthwise direction as mentioned above, but oil booms of other types such as oil boom composed of a continuous flexible skirt and a continuous float attached thereto may be employed. In the latter case, the engaging projection 9a of the endless belt 9 bites into the oil boom to a certain degree, so that a slip phenomenon caused between the endless belt and the oil boom can be prevented completely.

As explained above, by operating the device according to the invention after the oil boom a is placed in a given position, the oil boom can easily and surely be pulled up or payed out without departing from the endless belt 9. Furthermore, the movement of the oil boom a is restricted by slightly uring it against the endless belt 9 with the bottom portion 16a of the pusher member 16. Therefore, even if unreasonable force is applied to the oil boom in the pull-up and pay-out operation, such force may be escaped to a certain extent in association with the flexibility of the endless belt 9 and the pivot action of the pusher member 16, whereby the damage of the oil boom can be prevented.

What is claimed is:

1. A device for pulling up and paying out an oil boom formed by a plurality of longitudinally spaced floats fixed to at least one side of a continuous flexible skirt at certain equally spaced predetermined intervals, said device comprising:
a structural frame,
a pair of end pulleys journaled to said frame for rotation about substantially horizontal axes at positions spaced from each other,
an endless belt engaging said end pulleys and having on its outer surface a plurality of float engaging projections for said oil boom,
a pusher member mounted in juxtaposition to said structural frame overlying and facing the projection on a surface of the endless belt,
means for resiliently supporting said pusher member at a given distance relative to said endless belt and wherein said engaging projections are arranged on said endless belt at intervals substantially equal to the intervals between said float on said oil boom.

2. A device as claimed in claim 1, wherein one of said end pulleys is inclined at a vertical position lower than said other end pulley such that said endless belt approaches the water surface.

3. A device as claimed in claim 1, wherein said pusher member is pivotably journaled to a supporting member positioned on said frame and to the side of said endless belt, and said means for resiliently biasing said pusher member towards said endless belt comprises means for resiliently pivoting said pusher member about the journal axis.

4. A device as claimed in claim 1, wherein said pusher member is resiliently supported by compression springs located on said structural frame.

* * * * *